United States Patent [19]
Porteous et al.

[11] 4,111,789
[45] Sep. 5, 1978

[54] RECOVERY OF HYDROCARBON FROM DILUTION CENTRIFUGING TAILINGS

[75] Inventors: Kenneth Porteous; Leigh Falkenberg, both of Edmonton; Stephen Lane, Sherwood Park, all of Canada

[73] Assignees: Her Majesty the Queen in right of Canada, as represented by the Minister of Energy, Mines and Resources, Ottawa; Her Majesty the Queen in right of the Province of Alberta, Department of, Education Energy and Natural Resources, Alberta Syncrude Equity, Edmonton; Ontario Energy Corporation; Imperial Oil Limited, both of Toronto; Canada-Cities Service, Ltd., Calgary; Gulf Oil Canada Limited, Toronto, all of Canada

[21] Appl. No.: 768,545

[22] Filed: Feb. 14, 1977

[51] Int. Cl.² ............................................. C10G 1/04
[52] U.S. Cl. ............................................. 208/11 LE
[58] Field of Search ................ 208/11 LE; 210/44.83

[56] References Cited

U.S. PATENT DOCUMENTS

| | | | |
|---|---|---|---|
| 3,487,003 | 12/1969 | Baillie et al. | 208/11 LE |
| 3,607,720 | 9/1971 | Paulson | 208/11 LE |
| 3,884,829 | 5/1975 | Moyer | 208/11 LE |
| 3,990,885 | 11/1976 | Baillie et al. | 208/11 LE |

*Primary Examiner*—Herbert Levine

[57] ABSTRACT

The invention has to do with treatment of dilution centrifuging tailings which are produced in connection with a hot water extraction operation for recovery of bitumen from oil sands. The tailings are subjected to induced gas flotation for a predetermined period of time to recover contained hydrocarbons as froth.

6 Claims, 3 Drawing Figures

RECOVERY OF HYDROCARBON FROM DILUTION CENTRIFUGING TAILINGS

BACKGROUND OF THE INVENTION

This invention relates to a process for recovering hydrocarbons from tailings produced by a dilution centrifuging circuit within an oil sand operation employing the known hot water extraction process. It also encompasses the hydrocarbon froth product obtained by the practise of the process.

The hot water extraction process, used commercially to recover bitumen from the Alberta oil sands, involves the following series of steps:

(1) slurring, heating and conditioning the oil sand in a rotating drum in which it is mixed with steam, hot water and caustic;

(2) diluting the slurry with more hot water and introducing it into a primary separation vessel where it is retained to permit buoyant bitumen particles to rise to the surface and form primary froth;

(3) withdrawing a stream of middlings from the midpoint of the separation vessel and subjecting it to induced air flotation in a secondary recovery flotation call to cause contained bitumen to form secondary froth; and (4) combining the primary and secondary froths to form a combined froth product.

The dilution centrifuging process used to remove water and solids from the froth product of the hot water extraction process involves the following steps:

(1) diluting the combined froth product with naphtha to alter the viscosity and specific gravity of the contained bitumen; and (2) introducing the diluted froth into a two-stage centrifugal separation circuit where the coarse solids are separated from the stream in a scroll-type centrifuge and the water and fine solids are separated in a disc-type centrifuge.

The combined hot water extraction and dilution centrifuging processes are hereinafter collectively termed "hot water extraction operation".

There is a significant loss of hydrocarbons in the dilution centrifuging (D.C.) tailings produced by the scroll and disc centrifuges. More particularly, in the plant presently being constructed by the assignee of this invention, there will be approximately 1.6 million pounds/hour of D.C. tailings produced containing approximately 3.5% by weight bitumen, 2.1% hydrocarbon diluent, 24.0% solids and 70.4% water. The losses of bitumen and diluent per day will be approximately 3,900 barrels and 3,200 barrels, respectively. These figures are only given by way of example, as it is expected that they will vary significantly with plant operating conditions and throughput.

The tailings composition shown above corresponds to the predicted values for a commercial plant. The tailings actually used in developing this invention were derived from pilot plant operations and contained a significantly greater proportion of water, as indicated in Example I. This extra water is a direct result of the mechanical configuration of the pilot plant centrifuges. However, the recovery of hydrocarbon from the pilot plant tailings is more difficult than it will be from the actual tailings, because the hydrocarbon content of the pilot plant tailings is reduced by the extra water.

A problem which has heretofore existed was how to economically recover the hydrocarbons contained in the D.C. tailings. If such a process could be developed, it would also be desirable that the diluent and bitumen be recovered in a single step. In this regard, it needs to be kept in mind that the D.C. tailings is a unique and difficult material to deal with. It contains a relatively small amount of bitumen and diluent distributed throughout a large quantity of water and solids. The bitumen in the tailings is originally recovered as part of the froth produced by the hot water extraction process. Its rejection to the D.C. tailings together with the proportionate amount of diluent suggests that these hydrocarbons are physically associated with the froth solids. Hence, despite the fact that the specific gravity of the diluted bitumen is less than 1.0, it still reports to the tailings. This is borne out by simple settling tests on D.C. tailings, in which it is found that only minor quantities of the hydrocarbons present float and the bulk of them are found in the solids which settle out.

SUMMARY OF THE INVENTION

It has now been found that induced gas flotation can successfully applied to D.C. tailings to recover the major portion of the bitumen and diluent. While minimum amounts of aeration and agitation are required to achieve hydrocarbon flotation, it has been determined that recovery varies significantly only with retention time up to a definite limit, at which point the process becomes relatively insensitive to changes in the operating conditions. It has also been determined that the relationship between retention time and recovery holds true for feedstocks of different compositions. Thus a preferred process employing multiple flotation cells has been outlined. In this process, the retention time for each cell falls within the predicted range wherein recovery from that cell is significantly sensitive to retention time. The process has successfully been practised to recover most of the bitumen and diluent contained in the D.C. tailings. The unique froth product holds the hydrocarbons in a contaminated but concentrated form which can be either fed directly to the primary upgrading process or subjected to additional treatment to remove solids and water.

When the flotation cell is open to the atmosphere, it is found that some of the diluent is lost while the greatest part of the balance reports in the froth. In a preferred form of the invention, flotation is carried out in one or more sealed flotation cells using an inert gas, such as nitrogen, as the flotation agent. The excess gas collected from these cells is recycled to the flotation cells and ultimately becomes saturated with diluent vapors. When this state is reached, the recycled flotation gas no longer strips diluent from the tailings and the diluent then reports to the froth in the same proportion as the bitumen. Tests have shown that the flotation efficiency, using nitrogen as the flotation gas, is unaffected by diluent vapor.

An alternative to the procedure of recycling saturated nitrogen to the flotation cell, involves employing a condensor to remove diluent vapor from the vent gas before it is recycled. In this manner, some diluent can be recovered as liquid, and some is recovered in the froth. Both methods are effective to reduce the losses incurred by running the flotation cells open to the atmosphere.

In another preferred feature of this invention, it has been found desirable to maintain the aeration rate in the flotation vessel below 0.2 SCFM of gas per cubic foot of vessel capacity, while maintaining a minimum power input of 0.04 horsepower per cubic foot of vessel capacity. (It is to be understood that the term "aeration" as used herein is to be interpreted broadly to include introduction of an inert gas as the flotation agent.)

The froth product obtained from this flotation process practised on D.C. tailings is unique in composition. It comprises 8 to 28% by weight hydrocarbons (that is bitumen plus diluent), 70 to 37% water and 22 to 43% solids. In comparison to the original D.C. tailings, the hydrocarbons are present in greater concentration in this product and some solids and most of the water have been rejected; in comparison to combined primary and secondary froth, the present product contains perhaps twice as much water and three times as many solids. In any event, the product is a feedstock which can feasibly be treated to recover contained hydrocarbons as a pure product.

The invention is characterized by the following advantages:

(1) A large proportion of the hydrocarbons in the D.C. tailings can now economically be recovered in a more concentrated form and water and solids can simultaneously be rejected; and (2) The froth product is proportionately small in volume when compared with the original D.C. tailings and is amenable to further treatment at reasonable cost to recover the bitumen in pure form.

DESCRIPTION OF THE PREFERRED EMBODIMENT

Starting Material

The pilot plant D.C. tailings, which formed the feedstock for the development work involved in this invention, comprised a mixture of scroll centrifuge tailings and disc centrifuge tailings provided in a ratio of about 1 to 12. These two streams were blended and usually heated in a mix tank to form a mixture having a temperature of about 170° F.

Flotation

Figure 1:
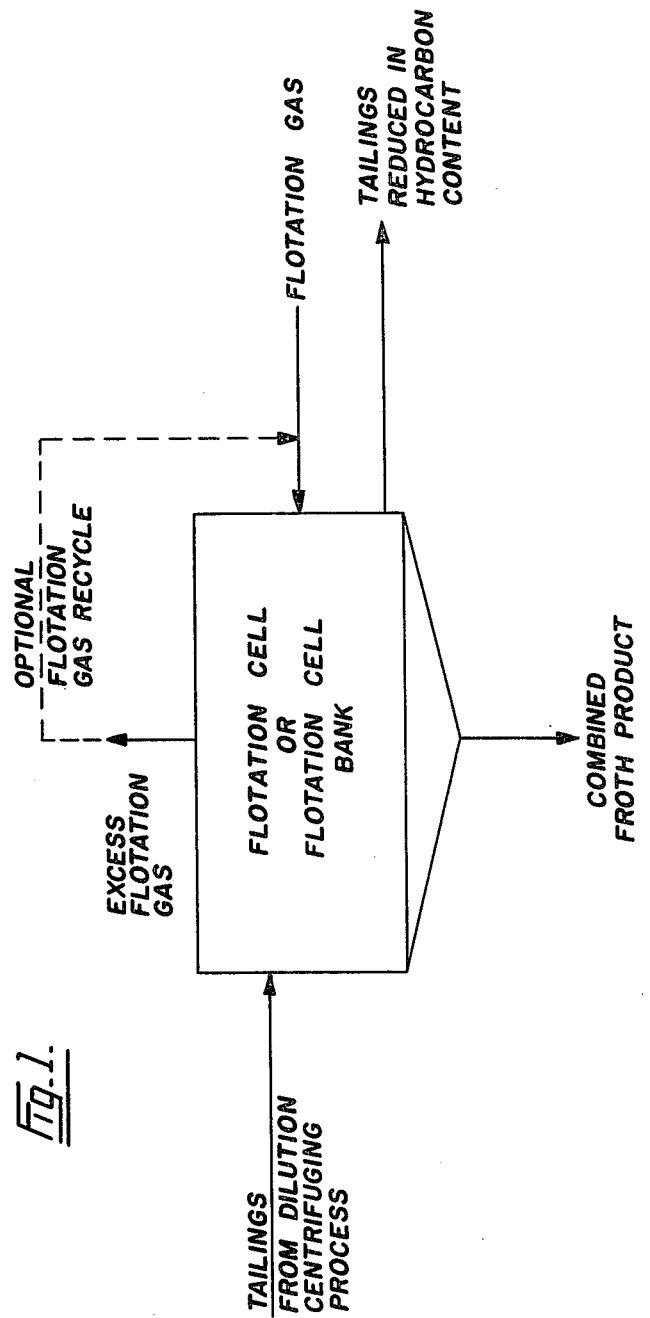
FIG. 1 is a block diagram setting forth the steps of the process.
Figure 2:
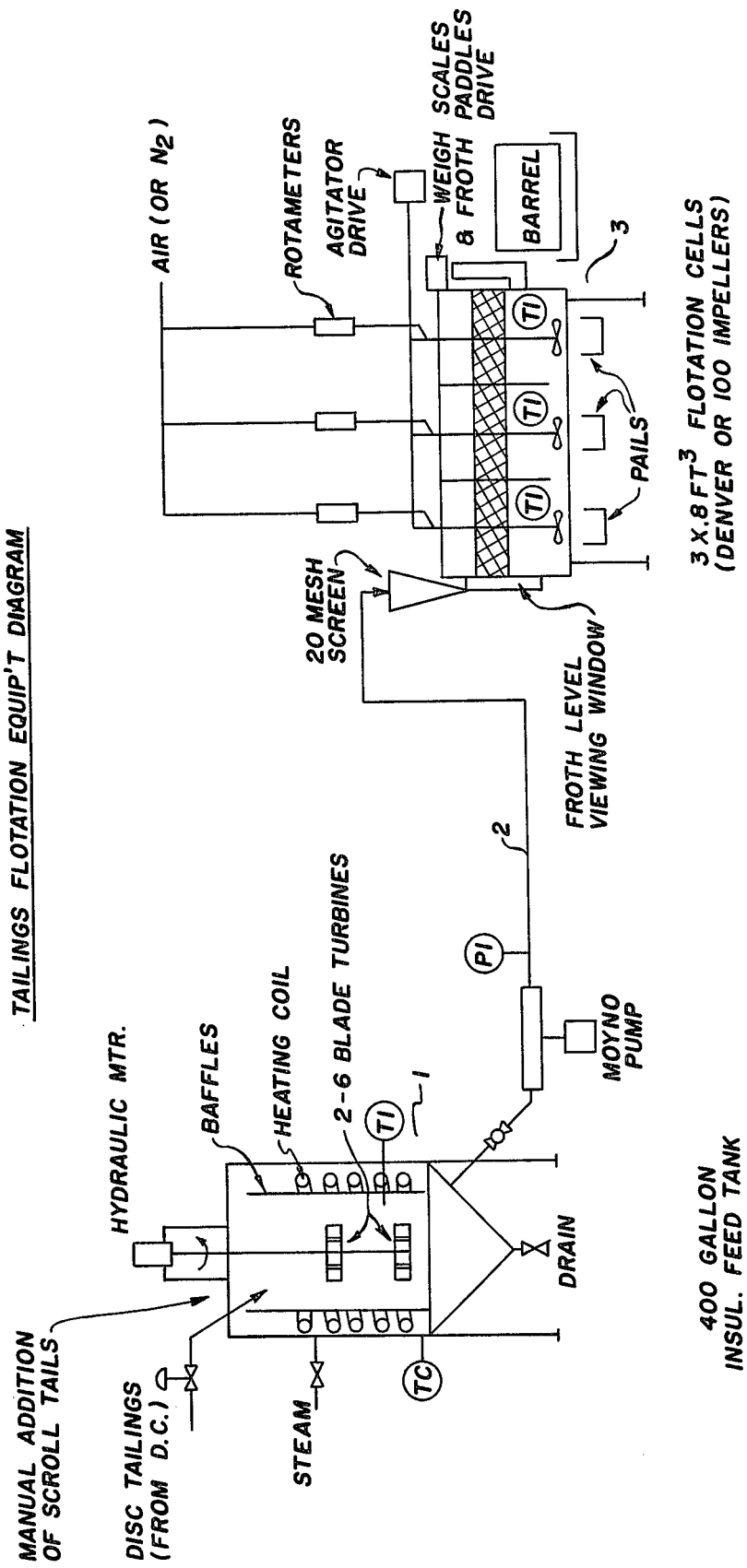
FIG. 2 is a schematic diagram of the circuit used to carry out the experiments involved in developing the invention.

This mixture was introduced into a conventional induced gas flotation cell or into the first of a bank of such cells. The laboratory pilot plant used to develop the invention is illustrated in FIG. 2. It comprised an agitated heating tank 1 to which cold disc and scroll tailings were fed manually and mixed and heated to about 170° F. The product was pumped through a line 2 to a series of 3 Denver TM induced air flotation cells from which the froth and tailings products were obtained.

Figure 3:
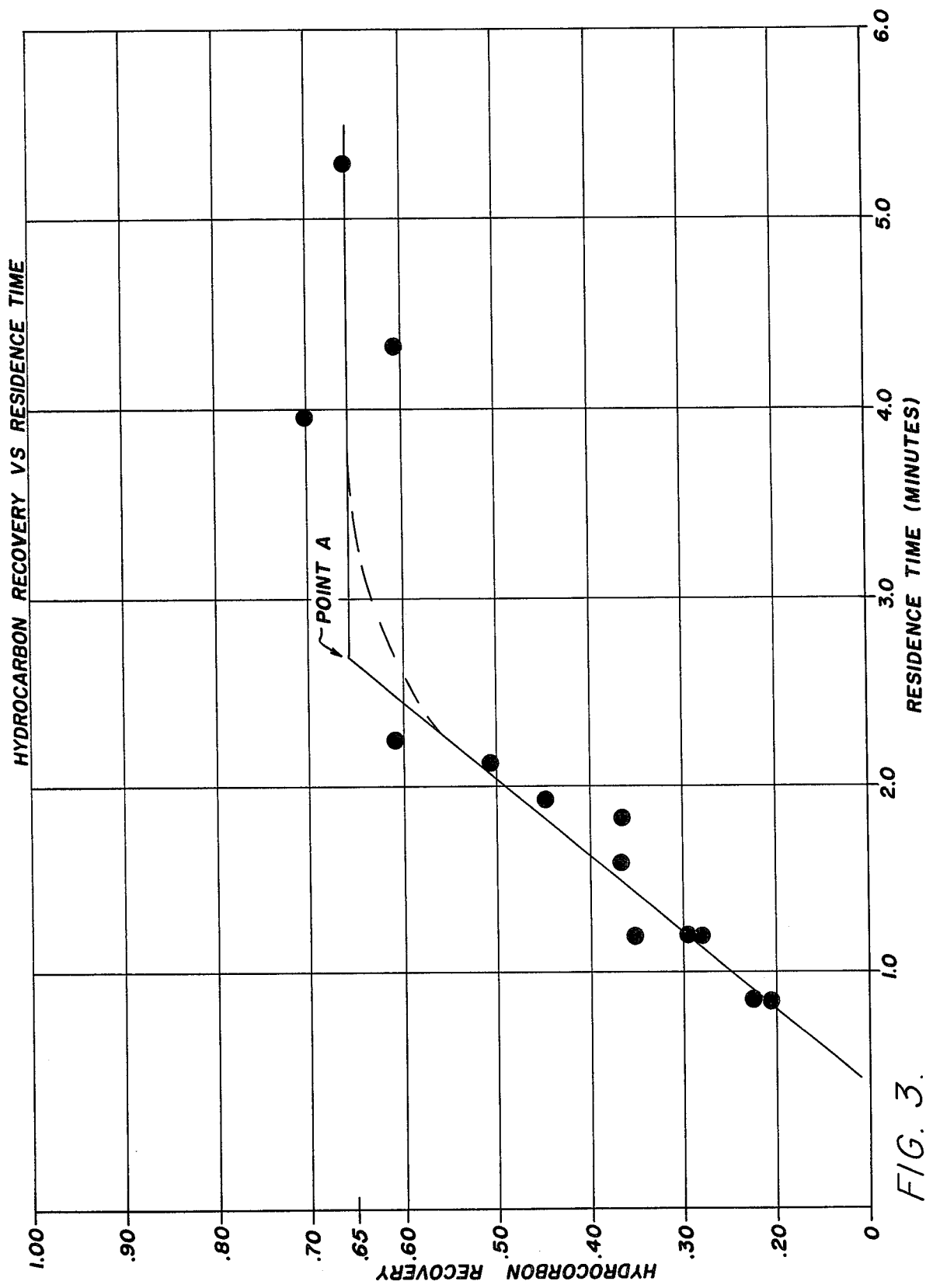
FIG. 3 is a plot of hydrocarbon recovery versus retention time for a single cell system.

As previously mentioned, the most significant parameter with respect to the operation of the flotation cell was its retention time. As shown in FIG. 3, the slope of the curve obtained by plotting hydrocarbon recovery against retention time was consistently steep until it changed suddenly at point "A", after which increased retention time yielded little increase in recovery. This finding requires that one should choose a cell having sufficient volume to provide a retention time corresponding with or close to the retention time at which the slope of the curve changes suddenly, for the particular D.C. tailings feedstock being processed. Now this choice will, of course, be also influenced to some extent by the economics of cell size and the limited range of sizes which are commercially available.

It has also been found that the recovery-retention time curve for a single cell, such as is shown in FIG. 3, provides a reliable indication of the performance of additional cells placed in series downstream from the first cell. In other words, a reliable scale up is achieved by using the data from a single cell for a plurality of cells operating downstream from it and receiving its underflow.

There is a minimum agitation level required in the cell, below which "sanding out" can occur. More particularly, it is preferred to operate the vessel above a minimum power input of about 0.04 H.P./ft.$^3$ of cell volume.

It has also been found that there is an air injection rate above which there is little improvement in recovery. More particularly, it is preferred to operate the flotation cells at an aeration rate of less than 0.2 SCFM/cu. ft. of cell volume, as this is sufficient to recover the hydrocarbon.

It is also preferred to use multiple cells in series to improve the ultimate recovery. These cells can all be operated at the same condition.

If desired, nitrogen may be used with sealed cells to avoid losing diluent to the atmosphere and to eliminate the safety hazard associated with air-naphtha vapor mixtures.

The invention is illustrated by the following examples.

EXAMPLE I

This example involves the operation of a single cell open to the atmosphere. About 250 pounds of scroll tailings and 350 Imperial gallons of disc tailings were placed in a tank and heated to 170° F. with agitation. The time required to accomplish this heating was approximately 1 hour. The analyses of the two tailings was as follows:

TABLE I

| | (Run L13) | | |
|---|---|---|---|
| % by weight | Typical Scroll Tailings | Typical Disc Tailings | Measured D.C. Tailings |
| hydrocarbons | 6.46 | 1.50 | 1.70 |
| solids | 75.00 | 4.00 | 6.85 |
| water | 18.50 | 94.50 | 91.45 |

This mixture was fed at 23.5 lbs./min. into a 0.8 cubic foot capacity flotation cell equipped with a Denver Sub-A type aeration impellor. Air was fed into the body of tailings through the impellor mechanism. The cell operating conditions were as follows:

| | |
|---|---|
| retention time | 2.26 minutes |
| impellor speed | 750 r.p.m. |
| air rate | 0.175 SCFM/cu. ft. of cell volume |
| power input | 0.09 HP/cu. ft. of cell volume |

Froth and tailings products were obtained at respective rates of 1.59 and 21.91 lbs./min. and had the following compositions:

TABLE II

| % by weight | Froth | Tailings |
|---|---|---|
| hydrocarbons | 15.61 | 0.73 |

TABLE II-continued

| % by weight | Froth | Tailings |
| --- | --- | --- |
| Solids | 30.44 | 5.57 |
| Water | 53.95 | 93.70 |

EXAMPLE II

This example illustrates that a reliable scale up is obtained by using recovery data developed by a single cell and applying it to a bank of cells operating under similar conditions.

The underflow or tailings from Example I was subjected to two additional flotation stages. With the exception of retention time, the cell design and operating conditions were identical to those of Example I. The retention time varied slightly from cell to cell by virtue of the froth produced which tended to reduce the volume of material fed to the next cell. Table III summarizes the experimental results:

TABLE III

| | Run L13 | | |
| --- | --- | --- | --- |
| | Cell 1 | Cell 2 | Cell 3 |
| Retention Time per Cell - minute | 2.26 | 2.42 | 2.47 |
| Froth Produced lb./minute | 1.59 | 0.39 | 0.27 |
| Froth Composition - % by weight | | | |
| hydrocarbons | 15.61 | 18.09 | 17.64 |
| solids | 30.44 | 36.54 | 32.28 |
| water | 53.95 | 45.37 | 49.98 |

The total froth and final (Cell 3) tailings were obtained at respective rates of 2.25 and 21.25 lb./minute and had the following composition:

TABLE IV

| % by weight | Run L13 Total Froth | Final Tailings |
| --- | --- | --- |
| hydrocarbons | 16.28 | 0.19 |
| solids | 31.73 | 4.66 |
| water | 51.99 | 95.15 |

Cell 1 recovered 60.89% of the hydrocarbon (bitumen plus naphtha) fed to the bank of cells. This number was used to calculate the hydrocarbon recovered in cells 2 and 3. Table V shows a comparison between calculated and measured performance. The total hydrocarbon recovery for the cell bank was adequately predicted from the single cell value.

TABLE V

| | Run L13 | | |
| --- | --- | --- | --- |
| | Cell 2 | Cell 3 | Total (Cell 1 + Cell 2 + Cell 3) |
| % of Cell 1 Feed Hydrocarbon Recovered | | | |
| Measured | 17.56 | 11.62 | 90.08 |
| Calculated | 23.81 | 9.32 | 94.02 |

EXAMPLE III

This example illustrates that hydrocarbon recovery is insensitive to increases in cell air input in the range 0.175 to 0.512 SCFM/cu. ft. of cell volumen. Therefore the preferred air input is less than 0.175 SCFM/cu. ft. of cell volume. Runs L25, L26 and L27 were carried out at three different air rates while other operating conditions remained essentially constant. Runs L43, L44 and L45 were accomplished in a similar manner. The major difference between these two sets of runs was in cell retention times which were nominally 0.9 minutes and 1.25 minutes respectively.

TABLE VI

| Run | Av. Input SCFM/cu. ft. cell | Cell 1 Recovery |
| --- | --- | --- |
| L25 | 0.175 | 23.41 |
| L26 | 0.325 | 23.86 |
| L27 | 0.512 | 23.52 |
| L43 | 0.175 | 40.36 |
| L44 | 0.325 | 46.58 |
| L45 | 0.512 | 39.97 |

EXAMPLE IV

This example illustrates the single cell relationship between hydrocarbon recovery and retention time. Such a correlation can be used in sizing banks of multiple cells.

An important feature is that recovery initially increases steadily with retention time but eventually the slope of the curve changes abruptly and becomes flat, so that further increases in residence time yield relatively little improvement in recovery.

A number of experiments were undertaken in which tailings were prepared and passed through the flotation cell as described in Example I. Feed rates to the cell were varied such that cell retention times ranged from about 0.9 minutes to 5.2 minutes. Impellor speed and power input were maintained constant at 750 rpm and 0.09 H.P./cu. ft. of cell volume. Air rates ranged from 0.175 to 0.512 SCFM/cu. ft. of cell, but as shown in Example III the recovery is independent of air rate. FIG. 3 shows the recovery-retention time relationship obtained from this series of runs.

The embodiments of the invention in which an exclusive property or privilege is claimed are defined as follows:

1. A method for treating tailings from the dilution centrifuging circuit of a hot water extraction operation for the recovery of bitumen from oil sands, said tailings containing bitumen, hydrocarbon diluent, solids and water, comprising:
   introducing the tailings into a flotation cell and retaining it therein for a sufficient period of time, while subjecting it to agitation and flotation using gas introduced into the base of the body of tailings, to recover a significant portion of the contained bitumen and diluent as froth and reject a portion of the solids and water as under flow; and
   removing the froth for further threatment.

2. The method as set forth in claim 1 wherein:
   the gas introduced for flotation is an inert gas which is recovered from the flotation cell and recycled to it.

3. The method as set forth in claim 1 comprising:
   recovering inert gas, containing diluent vapor, from the flotation cell;
   condensing diluent vapor from said recovered inert gas; and
   recycling the product inert gas to the flotation cell.

4. The method as set forth in claim 1 wherein:
   the retention time of the flotation cell is about that at which the slope of the recovery-retention time line plotted for the cell involved breaks sharply.

5. The method as set forth in claim 4 wherein:
   the flotation vessel is operated at an aeration rate of less than 0.2 SCFM of gas per cubic foot of cell capacity.

6. The method as set forth in claim 4 wherein:
   the underflow from the flotation cell is introduced into a second flotation cell wherein it is subjected to agitation and flotation using gas introduced into the base of the body of underflow to recover contained bitumen as froth.

* * * * *